US012095753B2

(12) United States Patent
Grinman

(10) Patent No.: US 12,095,753 B2
(45) Date of Patent: Sep. 17, 2024

(54) END-TO-END VERIFIABLE MULTI-FACTOR AUTHENTICATION SERVICE

(71) Applicant: Akamai Technologies, Inc., Cambridge, MA (US)

(72) Inventor: Alex Grinman, Brookline, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 300 days.

(21) Appl. No.: 17/697,036

(22) Filed: Mar. 17, 2022

(65) Prior Publication Data

US 2022/0329579 A1 Oct. 13, 2022

Related U.S. Application Data

(60) Provisional application No. 63/172,410, filed on Apr. 8, 2021.

(51) Int. Cl.
*H04L 9/08* (2006.01)
*H04L 9/06* (2006.01)
(Continued)

(52) U.S. Cl.
CPC ............ *H04L 63/08* (2013.01); *H04L 9/0825* (2013.01); *H04L 9/3213* (2013.01); *H04L 2463/082* (2013.01)

(58) Field of Classification Search
CPC ..... H04L 63/08; H04L 63/846; H04L 9/0825; H04L 9/3213; H04L 9/0643; H04L 9/3247; H04L 2463/082
See application file for complete search history.

(56) References Cited

U.S. PATENT DOCUMENTS 9,887,975 B1 2/2018 Gifford et al.
2005/0149759 A1 7/2005 Vishwanath et al.
(Continued)

FOREIGN PATENT DOCUMENTS

EP 3404901 B1 3/2021
KR 10-2015-0133938 12/2015
WO 2020140260 A1 7/2020

OTHER PUBLICATIONS

PCT/US2022/023946, International Search Report and Written Opinion, mailed on Jul. 8, 2022, 9 pages.

*Primary Examiner* — Vu V Tran
(74) *Attorney, Agent, or Firm* — David H. Judson

(57) ABSTRACT

An end-to-end verifiable multi-factor authentication scheme uses an authentication service. An authentication request is received from an organization, the request having been generated at the organization in response to receipt there of an access request from a user. The user has an associated public-private key pair. The organization provides the authentication request together with a first nonce. In response to receiving the authentication request and the first nonce, the authentication service generates a second nonce, and then it send the first and second nonces to the user. Thereafter, the service receives a data string, the data string having been generated by the client applying its private key over the first and second nonces. Using the user's public key, the service attempts to verify that the data string includes the first and second nonces. If it does, the authentication service provides the authentication decision in response to the authentication request, together with a proof that the user approved the authentication request.

17 Claims, 5 Drawing Sheets

(51) Int. Cl.
*H04L 9/32* (2006.01)
*H04L 9/40* (2022.01)

(56) References Cited

U.S. PATENT DOCUMENTS

| | | |
|---|---|---|
| 2016/0050234 A1 | 2/2016 | Choyi et al. |
| 2016/0286393 A1 | 9/2016 | Rasheed et al. |
| 2017/0111337 A1 | 4/2017 | Saboori et al. |
| 2018/0035293 A1 | 2/2018 | Elnekaveh et al. |
| 2018/0069702 A1 | 3/2018 | Ayyadevara et al. |
| 2018/0109504 A1 | 4/2018 | Poffenbarger |
| 2018/0248694 A1 | 8/2018 | Benoit et al. |
| 2018/0367526 A1* | 12/2018 | Huang ................ H04L 63/0807 |
| 2020/0092300 A1 | 3/2020 | Mital et al. |
| 2020/0233699 A1* | 7/2020 | Occhialini ............ G06F 9/4881 |
| 2020/0279255 A1 | 9/2020 | Douglas et al. |
| 2021/0044976 A1* | 2/2021 | Avetisov ................ G06F 21/64 |
| 2021/0385248 A1 | 12/2021 | Ilincic et al. |

\* cited by examiner

END-TO-END VERIFIABLE MULTI-FACTOR AUTHENTICATION SERVICE

BACKGROUND

Technical Field

This application relates generally to information security over networks.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

Many organizations rely on a variety of third-party internet services to operate their businesses, but one of the most crucial dependencies is an authentication provider. Organizations integrate a third-party software-as-a-service vendor to solve the difficult problem of authentication their users to internal systems. Often this outsourcing is justified because these third-party vendors are experts in building secure authentication systems, but there is a major cost. If the authentication provider is compromised, potentially every internal system protected with that vendor is also compromised. Vendors that are the most popular, become huge targets as they hold the keys to many kingdoms.

BRIEF SUMMARY

The subject matter herein provides a solution to this problem, namely, a hybrid system for a multi-factor authentication provider capable of achieving the best of both worlds: (1) an external authentication-as-a-service system (2) capable of providing cryptographically, end-to-end (E2E) verifiable assertions each time a user is authenticated. The approach herein may be implemented in association with an overlay network.

According to one embodiment, an end-to-end verifiable multi-factor authentication scheme uses an authentication service. An authentication request is received from an organization (or more generally, an "entity"), the request having been generated at the organization in response to receipt there of an access request from a user. The user has an associated public-private key pair. The organization provides the authentication request together with a first nonce. In response to receiving the authentication request and the first nonce, the authentication service generates a second nonce, and then it sends the first and second nonces to the user. Thereafter, the authentication service receives a data string, the data string having been generated by the client applying its private key over the first and second nonces. Using the user's public key, the authentication service attempts to verify that the data string includes the first and second nonces. If so, the authentication service provides the authentication decision in response to the authentication request, together with a proof that the user approved the authentication request.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION

Figure 1:
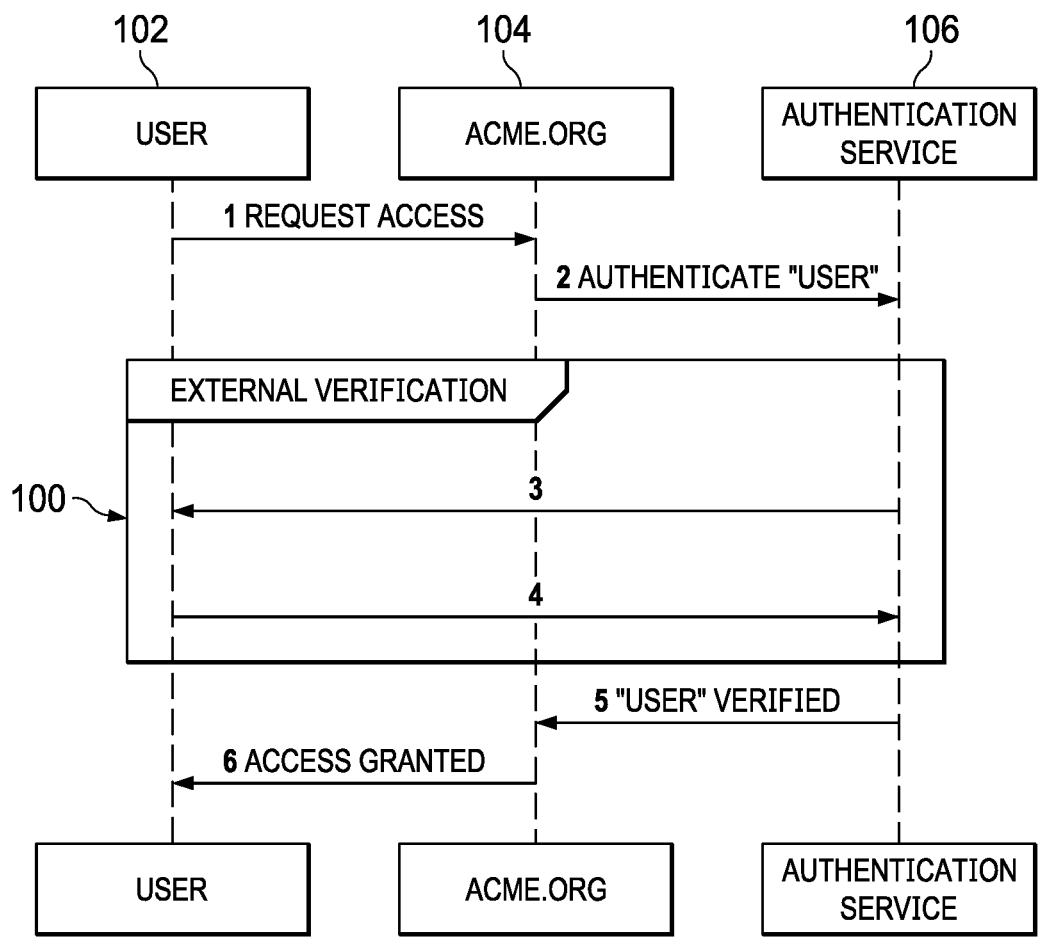
FIG. 1 depicts a traditional multi-factor authentication system.

By way of background, FIG. 1 shows a simplified architectural model of a known multi-factor authentication system 100. In this system, user 102 is requesting accessing to an organization (acme.org website) 104 that leverages an external authentication service 106. FIG. 1 depicts how the traditional multi-factor authentication in this context leverages two (2) separate layers of verification that are independent. In particular, steps (2) and (5) in the diagram in FIG. 1 show the trust relationship between the organization (acme.org) 104 and the external third-party 106 entrusted with authenticating the organization users (such as user 102). Steps (3) and (4) outline a separate trust relationship, namely, between the end user 102 and the authentication service 106 provider, and this relationship typically involves knowledge of a password, or a phone number to which passcodes are sent. In this architecture, step (5) is a critical point; in particular, the authentication service 106 is the authoritative decision maker regarding whether a user has been successfully authenticated. If the authentication service 106 itself is compromised it is possible that this service can then be manipulated to relay to acme.org 104 that any user of its choosing thus has been "verified." This creates significant security exposure.

Figure 2:
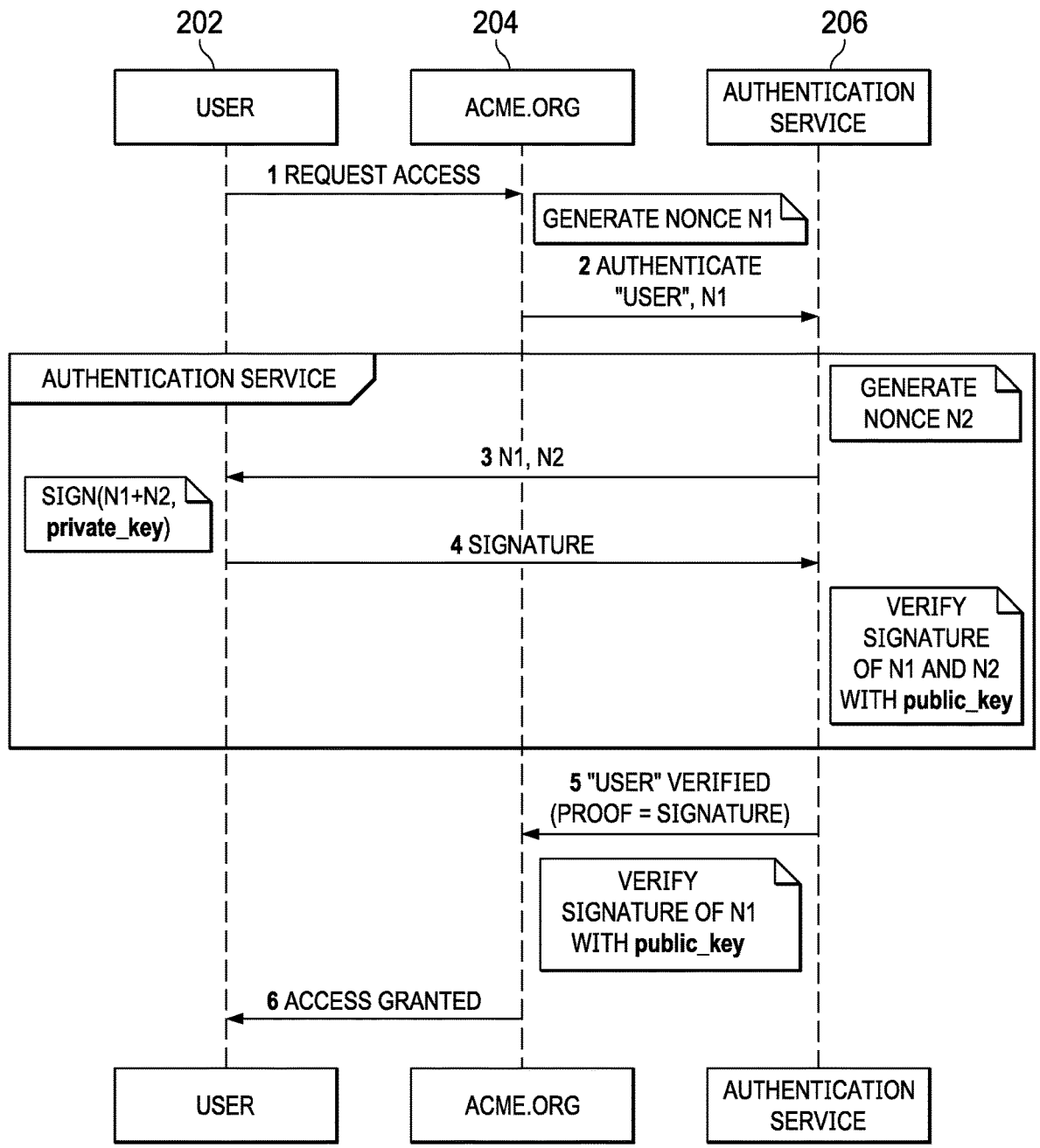
FIG. 2 depicts the end-to-end verifiable authentication system architecture of this disclosure.

FIG. 2 depicts the E2E verifiable authentication system of this disclosure. In this example, the same entities (user 202, organization 204, and authentication service 206) are depicted but the flow differs from that in the conventional process (FIG. 1) as follows. In particular, as used herein, a "nonce" preferably is a cryptographically random-generated token that is never reused. At a registration time, the user 202 generates a public-private key pair. The private_key is known only to the user 202 and no one else. The public_key of this key pair is known, potentially by everyone. A first nonce N1 is then included in the interaction as shown, namely, at step (2). The inclusion of N1 cryptographically binds the original authentication request in step (1) to the final authentication service decision in step (5). As also shown, a second nonce N2 is also included in the protocol. The second nonce N2 is generated by (or otherwise in association with) the authentication service 206. As will be seen, the inclusion of the second nonce serves as an independent authentication proof for the authentication service 206. With these changes, step (5) (as depicted in FIG. 1, and again in FIG. 2) is no longer vulnerable because the authentication service 206 provides a proof along with the authentication decision. This makes it possible for the organization (e.g., acme.org) 204 to independently verify that the user 202 indeed did approve the authentication request. Stated another way, if the authentication service 206 were compromised, there would still be no way of obtaining the user's private key, which key is never made available to the authentication service 206. The authentication service still remains a third-party vendor, but preferably (and as described in more detail below) it exposes elements of its internal verification system and uses asymmetric cryptography to bind together these two trust relationships.

The manner in which the public keys are distributed may vary, and there are several known ways to do this depending on what level of independent verification an organization desires. Regardless of this decision, however, the authentication service 206 still provides a proof, and the user's public key should normally not change. So, even at the lowest levels of independent verification, an organization leveraging the technique of the disclosure is always be able to cryptographically detect whether or not the user has been authenticating with the same key.

Additional Design Details

In one embodiment, the authentication service (e.g., FIG. 2, 206) is implemented, e.g., by an overlay network provider (e.g., a CDN), as a service layer. This implementation is not intended to be limiting. In the CDN example, the service layer is a web server (or a set of such servers), typically with support from back-end data storage layers. Generally, the service layer is responsible for providing a highly-available Application Programming Interface (API) and a web application (app) that one or more organizations depend on for authenticating the multi-factor credentials of their users. In a typical operating scenario, these one or more organizations also utilize one or more other services from the overlay network provider, such as content or application acceleration, web-based security, and the like.

The following describes core protocols and flows handled by the service layer in a representative implementation.

As used herein, applications are third party components that use the overlay network service layer APIs to enroll users and verify authentications for multi-factor devices. Typically, an organization administrator is responsible for provisioning new applications through a secure portal provided by the overlay network. A credential for an application preferably is randomly-generated, and the application uses this credential to authenticate to the service layer's APIs. Applications can be configured to have limited scope, e.g., it answers the question of "which APIs is this application allowed to use?" The portal enables the administrator to set the scope of the application, e.g., Verify API (permissions: to check and authenticate MFA devices), and Control API (permissions: administrator control plane to enable the admin to modify users, groups, policies, devices, bypass codes, etc.). The Verify API provides a RESTful interface for multi-factor authentication of a user's device. Preferably, these endpoints provide a mechanism for querying a user's available devices, request an authentication of a user's device, checking on the status of the authentication, and verifying that the authentication was successful. This API is useful for both third party providers who wish to integrate the service layer into their platform (e.g., Okta/Ping) and customers (organizations) who want to integrate the service layer into custom applications (e.g., an internal/proprietary authentication workflow or system). The Control API provides a RESTful interface for administering an organization on the service layer. As a skilled person will appreciate, these API endpoints deal with creating, reading, updating, and deleting (CRUD) entities like: users, groups, devices, bypass codes, policies, configuration settings, and audit logs. Most applications for integration purposes (i.e., integrations with Identity Providers (IdPs) like Shibboleth and Okta) have a default scope of just the Verify API, whereas other applications (e.g., an Active Directory (AD) connector) have a default scope of the Control API. Administrators can also create generic applications for developer use (i.e., programmatic/SDK use of the APIs) and set the scope manually.

Figure 3:
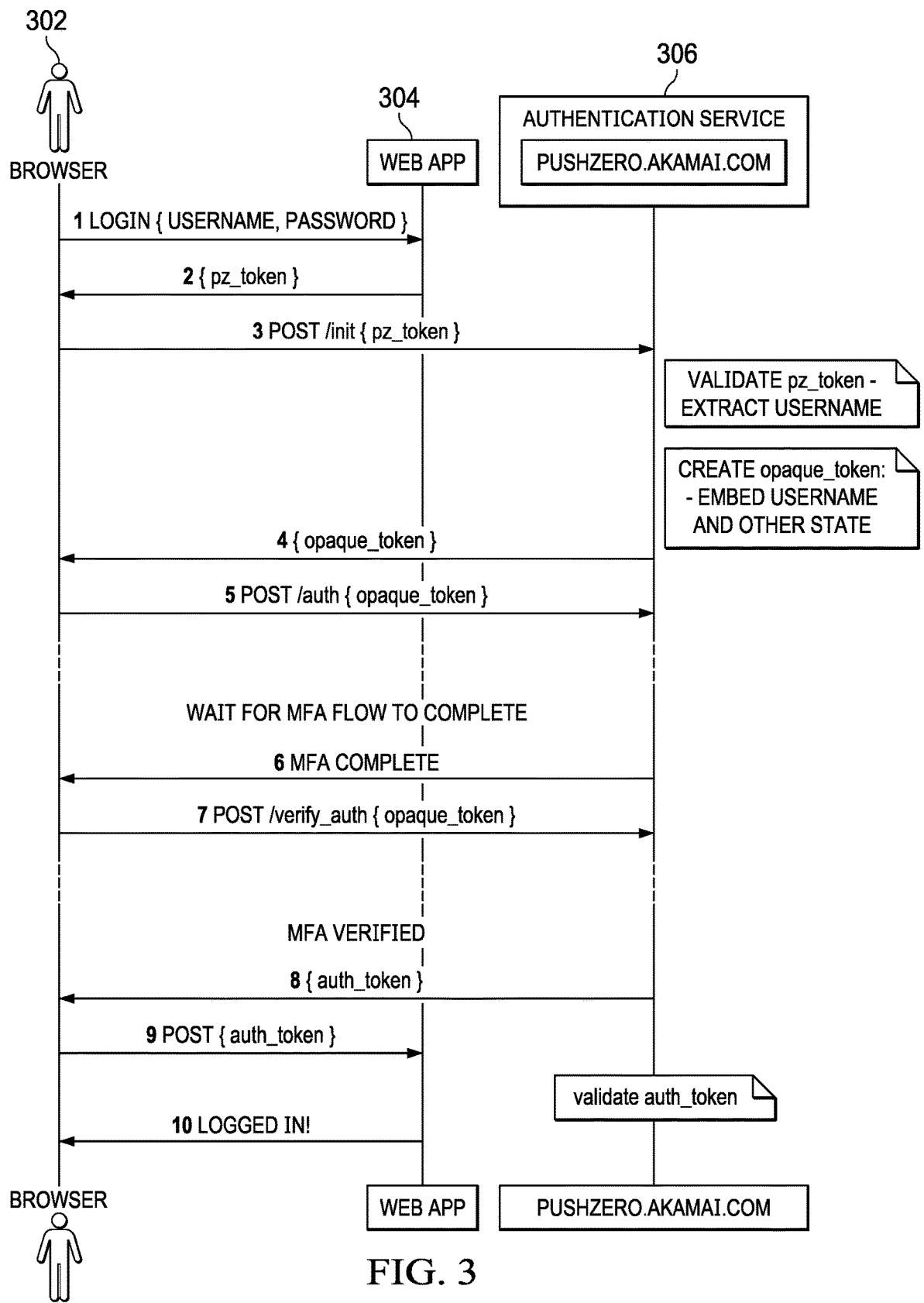
FIG. 3 depicts a representative web-based POST-bind API transaction flow that implements the E2E verifiable authentication system of this disclosure.

The most common way to integrate the service layer is to add it as a second step in a web-based authentication flow. Identity providers and platforms have different protocols in place for how to add such functionality. A representative web-based integration API supported by the service layer is a POST-bind API (a/k/a Bind API) that is depicted in FIG. 3. In this example scenario, the third-party app (or integration) is a web application 304 capable of authenticating a user 302 via some first factor (e.g., a username and password) and then adds a second factor authentication step by POST-binding the user to the service layer (in this example identified by the pushzero.akamai.com domain). PushZero is a service mark of Akamai Technologies, Inc., of Cambridge, Massachusetts.

To begin, and in this example scenario, an administrator generates a new "app" with type "bind" and obtains the generated configuration that contains the following relevant fields: app_id: a unique identifier for this integration; signing_key: a pre-shared secret key for signing requests to send to the service layer and also verifying responses from the service layer. With reference to FIG. 3, at step (1), the web app authenticates the user's primary credentials. At step (2), the web app uses its app_id and signing_key to create a signed token, such as:

```
request ← { 'app_id': <app_id>,
    'timestamp': <unix_time>,
    'username': <username>,
    'callback': <your_callback_url>,
    }
payload ← {'request': <request>}
signature ← HMAC-SHA256 (payload, signing_key)
```

Typically, the request and payload are JSON (JavaScript Object Notation) encoded objects. The signature proves that this third-party app (the web app) is permitted to use the service layer API on behalf of this tenant account. The username preferably is also signed so that no man-in-the-middle (i.e., even the user) is able to forge the principal in the request. Time information preferably is also included so that a TTL can be enforced on the signature to prevent replay. The pz_token is then preferably constructed as follows:

```
pz_token ← Base64({ 'payload':<payload>,
    'signature':<signature>})
```

At step (3), the web app POST-binds the user to the authentication service 306 with the pz_token. The authentication service uses pz_token to validate the request as follows: use the app_id to lookup the app_secret, verify the HMAC, verify time is within TTL, lookup tenant (via app_id), and lookup target user (via the username and tenant). The authentication service then embeds the current state and authenticated username and tenant into an opaque token:

opaque_token ← seal (tenant, username, timestamp, state)

At step (4), the authentication service 306 renders a POST-bind HTML page with the embedded opaque_token. At step (5), the authentication service 306 performs a POST request to itself at the /auth endpoint with the opaque_token. This endpoint is the entry point for an MFA flow continued in "Async Push Verification" section. At step (6), and after the MFA flow completes, the user is presented with a success page.

At step (7), this page (self) POST-binds to /verify_auth endpoint to hook back into the integration. In particular, the service layer uses the opaque_token to check the state and verify that the MFA is done and was allowed. In the state, the service layer knows which app integration triggered the MFA flow, and it proceeds to switch control back to the integration. Using the signing_key, the service layer then creates the following representative signature:

```
auth    ← { 'result': 'ALLOW',
            'app_id': <app_id>,
            'timestamp': <unix_time>,
            'username': <username> }
payload ← {'auth': <auth>}
signature ← HMAC-SHA256(payload, signing_key)
```

At step (8), the authentication service constructs and returns POST-bind page with an auth_token preferably constructed as follows:

```
auth_token ← Base64({ 'payload':<payload>,
                      'signature':<signature>})
```

At step (9), the page POST-binds back to the web app with the auth_token. The web app (server-side) validates the auth_token with its own signing_key (by checking the signature HMAC). The web app confirms the username is the same as in the initiated flow, checks the TTL via the timestamp, and ensures the result was "ALLOW." At step (10), the MFA step is complete, and the user is now logged in. This completes the processing in this embodiment.

The above processing flow is for Bind V1. A similar flow may be used for Bind V2, which is functionally identical but adds a required "verification key" to the protocol. Typically, this key is a separate public ECDSA (Elliptic Curve DSA) key used to verify the authentication token on the response flow.

Figure 4:
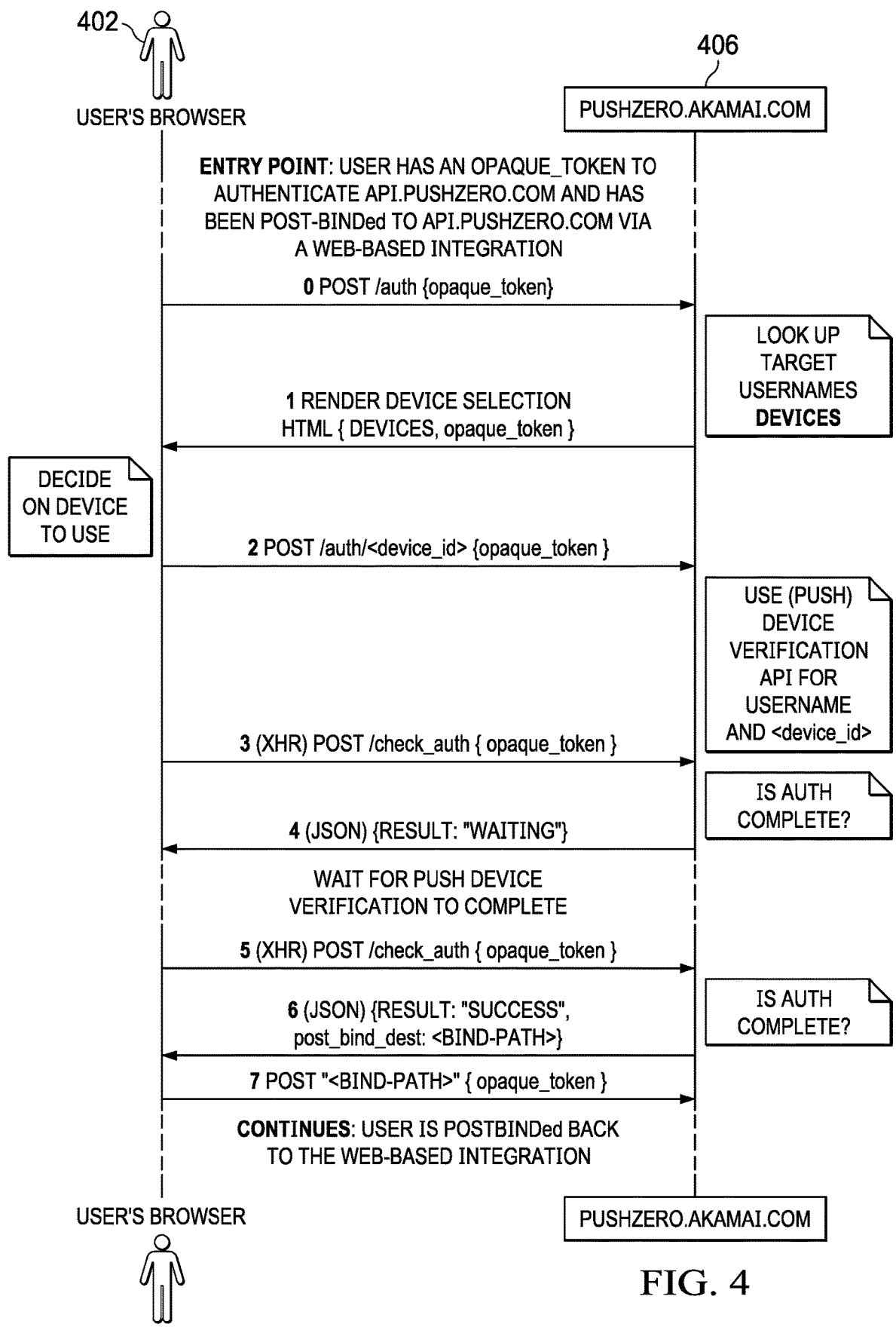
FIG. 4 depicts a representative asynchronous push verification flow that may be used during the API transaction flow depicted in FIG. 3.

The Asynchronous Push Verification (how a push MFA device is authenticated in a web-based flow) may proceed as follows, and with reference to FIG. 4. As noted above, on entry via a web-based integration, the user is POST-binded to the /web/v1/auth endpoint with an opaque_token that authenticates the context of the request including the tenant, username, and other application state. It is the integration's job to bootstrap the initial state and authenticate the user, tenant. Note that the opaque_token is included on each request to authenticate the user context and state. An opaque token is a private (encrypted and signed) cookie that is embedded in the page, typically in an HTML form used to authenticate each request to the server.

At step (1), the authentication service 406 looks up the user's devices and renders an HTML page with a list of the user's available MFA devices. At step (2), the user 402 decides which device they want to use. In this example scenario the user selects to use his or her iPhone® with the Service Layer iOS App. The user taps "Send me a push" and the page fires off a POST request with this device's identifier in the URL path. The Authentication service then creates a new authentication request. It gives this request a random tx_id (embedded in the opaque token), and it gives this request an expiration time (TTL) Next, the authentication service invokes a Push Device Verification Flow/Protocol with the supplied username and device. This flow takes place in parallel. In particular, the Push Device Verification Flow/Protocol takes place between a service layer client (e.g., an iOS or Android mobile app), and the authentication service. The details of this flow are described below.

Returning back to FIG. 4, in the web integration, an HTML page is rendered showing that the push was sent. At step (3), the web integration repeatedly checks for the authentication to succeed hitting the /check_auth endpoint. Preferably, long-polling (up to some configurable number of seconds) and optionally exponential back-off to prevent system overwhelming are utilized. At step (4), and in this case the MFA device has not been verified yet, so it responds with a JSON response indicating the MFA is pending. Finally, the push device verification completes. Then, at step (5), the web integration fires off another POST /check_auth to the authentication service. At step (6), and in this case, the request has been completed and allowed, so the authentication service responds with JSON indicating success and the next destination to POST-bind the user to (<bind-path>). At step (7), the web integration finally performs a POST-bind (to <bind-path>) with the opaque_token to initiate the integration-specific next step flow.

The following describes additional details regarding a push device protocol, which is the protocol between a mobile device client app (an iOS or Android-based app) and the authentication service described above. There are two primary goals for this protocol, namely, to verify that any message (like a multi-factor approve message) from an enrolled push device is authentic, and to send an authenticated and confidential authentication request to a push client over untrusted channels like APNS/GCM. The latter process is the Push Device Verification Flow/Protocol mentioned above. By way of additional background, the purpose of signing every message sent by a push device to the service layer is to bind the device to a cryptographic public key. This prevents an adversary from forging an authentication response (to approve a multi-factor authentication request) unless they also have the device private key. Most iOS® and Android® devices have crypto-coprocessor modules (sometimes called enclaves or TPMs). These modules can generate key pairs where the private keys cannot be extracted. On Android, Google® provides attestation certificates for keys generated in this enclave. This gives some sense of a guarantee during registration where this key originated. This assurance might be useful for customers to have. iOS Enclaves supports NIST-p256 curves only, while Android Enclaves support NIST-p256 curves and RSA.

In a representative embodiment, a SignedMessage structure embeds an underlying message along with a signature, authenticating that the message originates from a cryptographic identity bound to a specific push device. A message includes a header, and a body. The header includes a timestamp and a nonce to enable easy replay prevention and ensuring fresh messages only. A message body preferably supports several message types: AuthResponse, GetPendingRequests, UpdateDeviceToken, and NewDevice.

AuthResponse is a reply to an MFA authentication request, indicating the user's answer (allow/deny). GetPendingRequest is a request for the authentication service to return a list of pending MFA authentication requests for the device. This is useful in the case of APNS/GCM service outage or if the user dismisses a notification, in which case he or she is able to open the app and have it directly fetch any outstanding authentication requests. UpdateDeviceToken may be used if the push device has rotated its APNS/GCM-specific push authentication token (via the host OS) and to updates it on the app. NewDevice is the initial payload to register a push device (self-signed).

To deliver a push request to an iOS or Android device, the request is sent to APNS or GCM push notification service. To maintain the confidentiality of the requests, preferably requests are encrypted, e.g., using Authenticated Encryption (AE). In particular, payloads are encrypted to the device's public key before sending the payload to APNS/GCM. When the device receives a push, it first decrypts and verifies the payload using a shared secret key established (and generated by the device) during a device registration. For encrypted push requests, an EncryptedMessage structure embeds the ciphertext, a payload encrypted with the secret key of the push device. This structure also preferably embeds a public key (the cryptographic identity bound to the push device signing public key) so that the recipient knows which cryptographic identity this message was sent for. One push device might have multiple cryptographic identities, as one person with one phone might be using the authentication service in the context of several different customers. The message includes a header, and a body. The header includes a timestamp and nonce to enable easy replay prevention and ensuring fresh messages only. The body typically supports one type of message, namely, an "AuthRequest," although other message type may be used.

Figure 5:
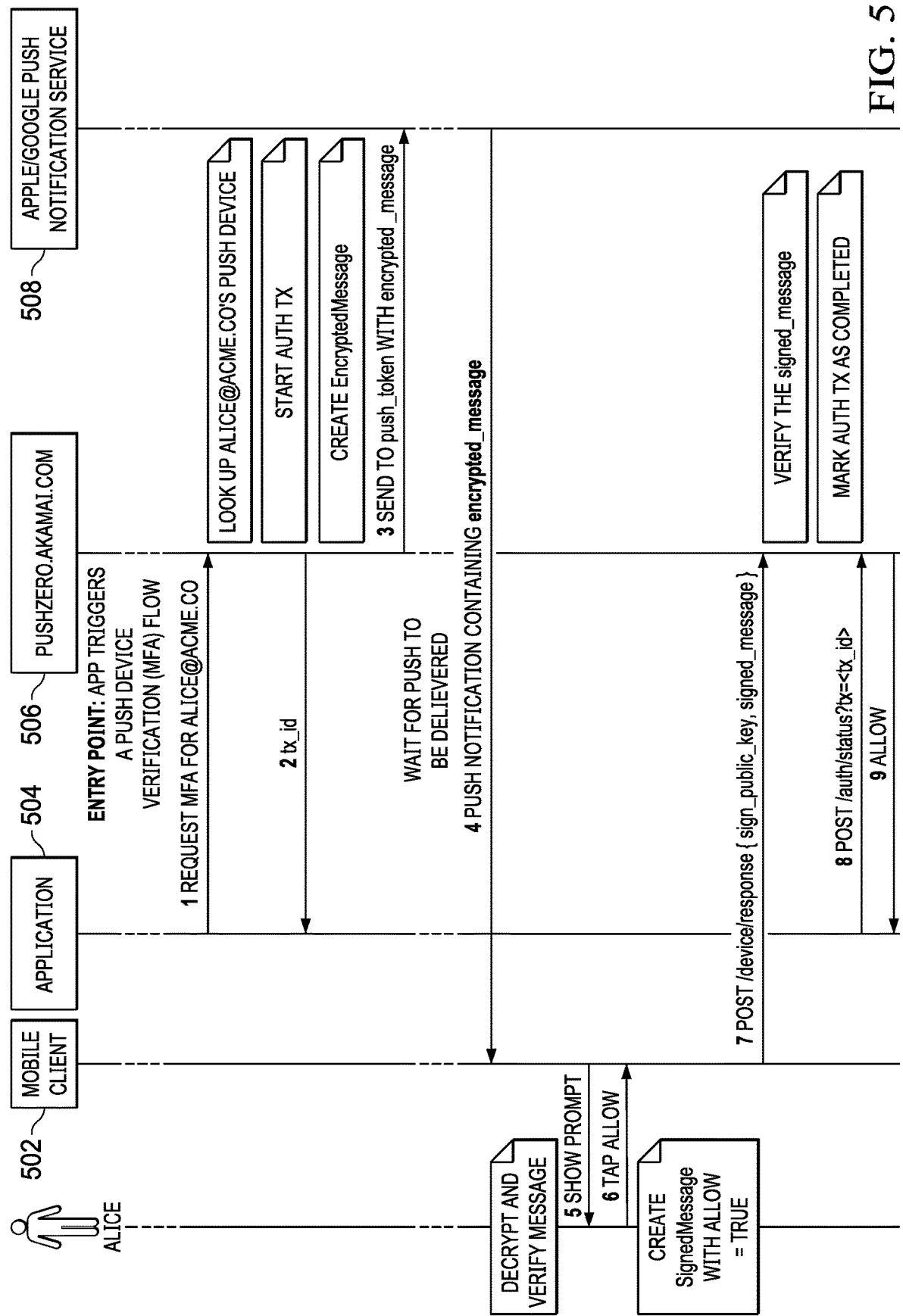
FIG. 5 depicts a representative device verification flow.

With the above messaging formats as background, and with reference now to FIG. 5, a representative push device verification flow is depicted. As noted above, the Push Device Verification Flow is responsible for authenticating a user's Push MFA device. The push device verification flow is used by web-based integration flows, e.g., through a web flow integration (see the Web Flow//Device Verification flow above), or it can happen programmatically by using the developer API directly. The application 504 verifying the user's MFA device 502 begins by specifying which user (and in some circumstances, which MFA device) to verify. At step (1), a device verification request is begun. Via an authorized API call, the application then invokes the push device verification flow by specifying the user (and optionally a push device identifier, if the user has multiple push devices registered).

The authentication service 506 begins a new authentication transaction for this request, identified by a transaction identifier: tx_id. At shown in step (2), the authentication service responds to the application by returning the tx_id. This is a handler for the application to track the status of this request (pending, denied, approved). At step (3), the authentication service 506 generates and sends an encrypted push notification. This is an EncryptedMessage with an AuthReq body encapsulating this request. Next, the authentication service looks up a default push device for the user (or a supplied device identifier if available). Using the push token and the model of the device (e.g., iOS/Android), the authentication service communicates with the respective APNS/GCM API 508, specifying the EncryptedMessage as the payload to send in the push encrypt. At step (4), and after the push arrives on the mobile client, the app decrypts the notification payload (the EncryptedMessage) and validates it. The mobile app 502 takes the context of the request (username/resource/geolocation, etc.) and prepares a local notification to show to the user. At step (5), the user gets alerted with a prompt, and the user decides to approve or deny the request. At step (6), and on the user's response, the mobile device app 506 creates a SignedMessage with an AuthResponse body, specifying a request_id in the payload and a Boolean indicating the user's decision: allow or deny. At step (7), the mobile app 502 fires off the request to the authentication service 506, specifying the device's identity public key as a header and the SignedMessage as the body. The authentication service 506 uses the public key in the header to identify the device, and it cryptographically verifies the SignedMessage payload. Using the request_id in the payload and the user derived from the device, the service matches the pending authentication transaction. The service then closes the transaction and records the device's response: allow/deny. At step (8), and while all the previous steps were executing, preferably the application 504 was long polling or periodically firing a status check request using the tx_id. Once the authentication service 506 records the response form the device, at step (9) it returns the device's decision, i.e., allow. The device verification is now complete.

The authentication service supports various auxiliary methods of multi-factor authentication. These include, without limitation, push, push TOTP (time-based one-time passcode), phish-proof push, U2F, WebAuthn, Hardware OTP (one time passcode), External TOTP, SMS OTP, Email OTP, Client-less push (SMS), client-less push (Email), phone call, and bypass codes. One example, phish-proof push, proceeds as follows.

Phish-proof push is a bridge between the user experience flow of a regular push MFA and the more advanced under-the-hood security policies of WebAuthn/U2F. There are two components to this solution: a mobile authenticator, and an extension. The mobile authenticator is built into the service layer mobile device app. The extension can exist as either a browser extension (Chrome/Firefox/Safari, etc.) or as a desktop agent (kernel extension) acting as a virtual USB authenticator. In either case, the extension injects cause the browser to think it is the hardware/platform authenticator and instead forwards those messages along an encrypted/authentication channel to the mobile device app. Preferably, a secure pairing protocol (of the browser to the mobile app) is used on demand by the user, e.g., by scanning a QR code, or out-of-band if there is another way of bootstrapping authentication between the extension and the mobile client.

Other Enabling Technologies

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution. An edge compute instance may be supported in a virtual environment.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system (running TCP) or the like.

The functionality may be implemented with other application layer protocols besides HTTPS, such as SSL VPN, or any other protocol having similar operating characteristics.

The techniques herein may be used irrespective of the traffic type.

There is no limitation on the type of computing entity that may implement the client-side or server-side of the connection. Any computing entity (system, machine, device, program, process, utility, or the like) may act as the client or the server.

Finally, while given components of the system have been described separately, one of ordinary skill will appreciate that some of the functions may be combined or shared in given instructions, program sequences, code portions, and the like.

The techniques herein provide for improvements to a technology or technical field, namely, overlay networking, as well as improvements to the functioning of edge server itself, namely, by extending its conventional functionality as has been described.

Having described the subject matter herein, what is claimed is set forth as follows.

The invention claimed is:

1. A method of authenticating a user requesting access to a network-accessible resource, the user associated with a client and having an associated public-private key pair, the key pair comprising a private key, and an associated public key, comprising:
   at an authentication service to which the resource is associated:
      receiving from the resource an authentication request, the authentication request having been generated at the resource in response to receipt of an access request from the user, the authentication request having associated therewith a first nonce;
      in response to receiving the authentication request and the first nonce, generating a second nonce, and sending the first and second nonces to the user;
      upon receipt of a data string, the data string having been generated by the client applying the private key over the first and second nonces, determining, using the associated public key, that the data string includes the first and second nonces; and
      upon verifying that the data string includes the first and second nonces, providing the resource an authentication decision in response to the authentication request, together with a proof that the user approved the authentication request.

2. The method as described in claim 1 wherein the first nonce and the second nonce are each a cryptographically random-generated one time use token.

3. The method as described in claim 1 wherein inclusion of the first nonce cryptographically binds the authentication request to the proof.

4. The method as described in claim 3 wherein inclusion of the second nonce provides an independent authentication proof for the authentication service.

5. The method as described in claim 1 wherein the data string is a signature generated by applying the private key over a concatenation of the first nonce and the second nonce.

6. The method as described in claim 1 wherein the authentication service is associated with an overlay network.

7. The method as described in claim 1 wherein the authentication service workflow is associated with an auxiliary method of multi-factor authentication.

8. The method as described in claim 7 wherein the auxiliary method of multi-factor authentication is one of: push, push TOTP (time-based one-time passcode), phish-proof push, U2F, WebAuthn, hardware OTP (one time passcode), external TOTP, SMS OTP, email OTP, client-less push by SMS, client-less push by email, phone call, and bypass codes.

9. The method as described in claim 1 wherein the first nonce is generated by the network resource.

10. An apparatus configured as an authentication service, comprising:
   a processor;
   computer memory holding computer program instructions executed by the processor, the computer program instructions including program code operative to authenticate a user requesting access to a network-accessible resource, the user associated with a client and having an associated public-private key pair, the key pair comprising a private key, and an associated public key, the program code configured to:
      receive from the resource an authentication request, the authentication request having been generated at the resource in response to receipt of an access request from the user, the authentication request having associated therewith a first nonce;
      in response to receiving the authentication request and the first nonce, generate a second nonce, and send the first and second nonces to the user;
      upon receipt of a data string, the data string having been generated by the client applying the private key over the first and second nonces, determine, using the associated public key, that the data string includes the first and second nonces; and upon verifying that the data string includes the first and second nonces, provide the resource an authentication decision in response to the authentication request, together with a proof that the user approved the authentication request.

11. The apparatus as described in claim 10 wherein the first nonce and the second nonce are each a cryptographically random-generated one time use token.

12. The apparatus as described in claim 10 wherein inclusion of the first nonce cryptographically binds the authentication request to the proof.

13. The apparatus as described in claim 12 wherein inclusion of the second nonce provides an independent authentication proof for the authentication service.

14. A computer program product in a non-transitory computer-readable medium comprising program code executable in hardware on a computing system configured as an authentication service, the program code operative to authenticate a user requesting access to a network-accessible resource, the user associated with a client and having an associated public-private key pair, the key pair comprising a private key, and an associated public key, the program code configured to:

receive from the resource an authentication request, the authentication request having been generated at the resource in response to receipt of an access request from the user, the authentication request having associated therewith a first nonce;

in response to receiving the authentication request and the first nonce, generate a second nonce, and send the first and second nonces to the user;

upon receipt of a data string, the data string having been generated by the client applying the private key over the first and second nonces, determine, using the associated public key, that the data string includes the first and second nonces; and upon verifying that the data string includes the first and second nonces, provide the resource an authentication decision in response to the authentication request, together with a proof that the user approved the authentication request.

15. The computer program product as described in claim 14 wherein the first nonce and the second nonce are each a cryptographically random-generated one time use token.

16. The computer program product as described in claim 14 wherein inclusion of the first nonce cryptographically binds the authentication request to the proof.

17. The computer program product as described in claim 16 wherein inclusion of the second nonce provides an independent authentication proof for the authentication service.

* * * * *